March 29, 1966     E. J. HALEY     3,243,698
NON-MAGNETIC SURFACE IRREGULARITY DETECTOR USING MAGNETIC
SURFACE COATING AND MAGNETIC DETECTOR
Filed April 8, 1963
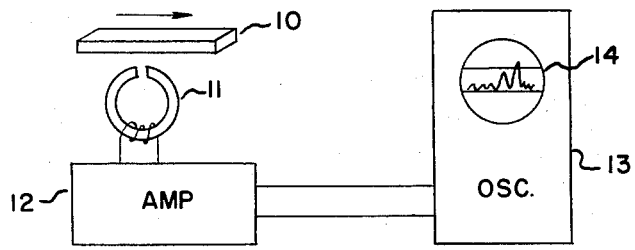
FIGURE 1
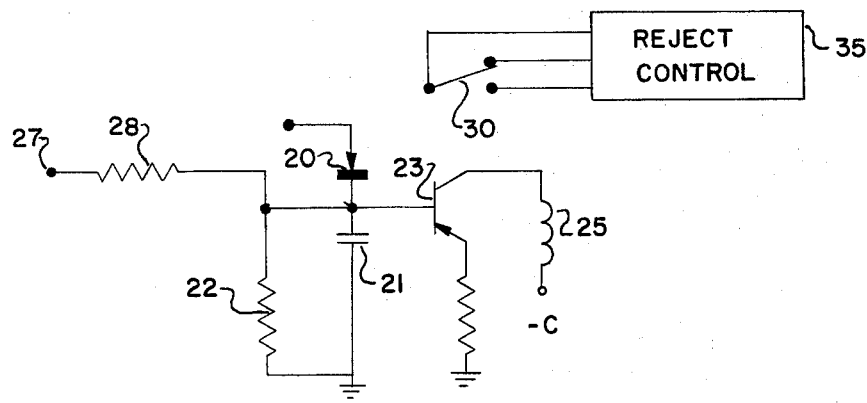
FIGURE 2
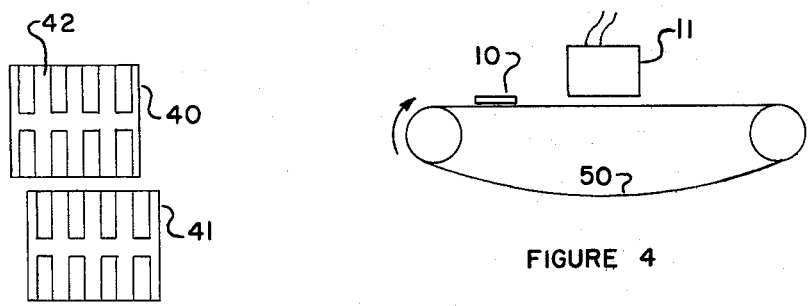
FIGURE 3
FIGURE 4
INVENTOR
ELDRED J. HALEY
BY Watson, Cole, Grindle & Watson
ATTORNEY

United States Patent Office 3,243,698
Patented Mar. 29, 1966

3,243,698
NON-MAGNETIC SURFACE IRREGULARITY DETECTOR USING MAGNETIC SURFACE COATING AND MAGNETIC DETECTOR
Eldred J. Haley, 216 Park Hill Road, Fairfax, Va.
Filed Apr. 8, 1963, Ser. No. 271,131
2 Claims. (Cl. 324—37)

This invention relates to electronic inspection equipment and methods and more particularly it relates to surface finish metering methods.

In the electronics field the art of modularizing circuits upon small ceramic wafers has been developed to the point that such devices are becoming micro-miniaturized. This results in extremely close tolerance on surface finish which must be maintained to retain quality and reliability of printed circuits placed upon the wafer surfaces. Classically the surface finish is measured tediously and slowly with stylus transducers passed across the surfaces. This is an extremely expensive procedure in terms of time and accuracy. Furthermore it is difficult to attain a thorough test because the stylus area must be small to detect minute imperfections and therefore any testing is practically limited to sampling of a very small percentage of the surface area. Accordingly an acceptable fast thorough test procedure for detecting minute defects on ceramic surfaces and the like has not been available.

Accordingly it is an object of this invention to provide improved surface irregularity detection methods and apparatus.

It is a more specific object of the invention to provide a rapid method of detecting minute defects upon flat surfaces.

In accordance with the invention, inspection of the surface of a printed circuit wafer to determine defects is done magnetically to permit high speed scanning of large surface areas. Thus, a thin uniform film of magnetizable material is deposited upon the surface to be tested by vacuum deposition or in some other suitable manner. The wafer is then transported at constant speed past a magnetic head serving to pick up signals introduced by surface defects. A peak detection is used in conjunction with the magnetic head to permit isolation of defective surfaces.

Other objects and features of the invention will be made evident from the following more detailed description, which refers to the accompanying drawing, wherein:

FIGURE 1 is a schematic sketch illustrating the inspection method afforded by the invention, FIGURE 2 is a schematic diagram of a failure detector which may be used in accordance with the teachings of the invention, FIGURE 3 is a plan view representation of magnetic heads used in accordance with one embodiment of the invention, and FIGURE 4 is a sketch of a conveyer mechanism illustrating principles embodied in the invention.

Referring now with particularity to the invention as illustrated in FIGURE 1, a surface as presented on a ceramic printed circuit wafer 10, or the like, is moved rapidly across the gap on a magnetic head 11. The surface of the wafer nearest the head 11 is coated with a very thin uniform film of magnetic material such as obtained by vacuum deposition. The material should be soft magnetizable material that does not become permanently magnetized. Thus as the wafer passes the gap in head 11, minute variations in distance of the magnetic surface from the gap will result in electrical signals at amplifier 12, which can be observed on oscilloscope 13. The screen may be calibrated to permit visible inspection for reject of wafers which produce signals exceeding a selected amplitude. Control of gain of amplifier 12 will serve to produce a selection of a threshold over a large range of defect conditions.

A significant advantage of this inspection method is the ability to pass wafers through at high speed. As the speed is increased as a matter of fact, the signals increase in amplitude, and electronic circuits can readily detect those signals representing defects in various ways. For example, in FIGURE 2, instantaneous pulses are detected by diode 20 and stored on capacitor 21 for a RC time period determined by resistor 22. As the accumulation of defects in a given time interval exceed the threshold determined by the setting of the amplifier gain, transistor 23 is turned on to operate relay 25. This transistor circuit is biased off by the voltage divider 28–22 from power supply terminal 27, and exceeds the threshold of conduction only when defective signal levels are encountered.

The reject relay 25 through contacts 30 can be used to operate an automatic reject chute for wafers conveyed past head 11 through a conventional form of reject control system 35.

Whenever relatively large surfaces are to be inspected, the gap in magnetic head 11 may tend to average a number of surface irregularities and fail to detect certain defects. Accordingly, multiple head assemblies such as 40–41 in FIGURE 3 may be used to give substantially full inspection of larger surfaces. These heads are conventional in use upon multiple track recorders for example. By staggering heads 40 and 41 substantially full coverage can be obtained even with inter head gaps 42 appearing in the head assemblies. In this case, a separate amplifier-detector is used for each head.

In this inspection method care must be taken to pass wafers past the head at constant speed and in close proximity to give readable signals without introduction of error signals such as wow and flutter. Accordingly the conveyer technique of FIGURE 4 is useful. The wafer 10 may be carried by belt 50 under head 11 and held in firm contact by elastic tension of the belt. Also the belt maintains a constant scanning speed.

It is evident that this inspection method is advantageous in selection of minute surface defects of printed circuit wafers and the like. The thin film of magnetizable material may be readily removed after use by chemical etching, etc. Thus, defective wafers may be eliminated before costly preparation of the printed circuits and the usual method of inspection through circuit operation.

Having disclosed the invention, the features of novelty are defined with particularity in the following claims:

1. A surface irregularity detector comprising, in combination, a magnetic head, means to convey a non-magnetic body with a substantially flat surface past said head, said surface having a thin coating of magnetizable material deposited thereon by vacuum deposition and adhering thereto, said thin coating being of uniform thickness and molding itself to the contours of said surface, means for detecting variations in a magnetic field generated by said magnetic head, said variations in said magnetic field being caused by changes in the distance of said thin coating from said magnetic head as said non-magnetic body is conveyed past said head, whereby irregularities in the substantially flat surface of said non-magnetic body are detected.

2. A surface irregularity detector as defined in claim 1 wherein a plurality of magnetic heads are placed in spaced positions from each other to comprehensively cover a substantial surface area of said substantially flat surface.

References Cited by the Examiner
UNITED STATES PATENTS

| | | | |
|---|---|---|---|
| 2,970,256 | 1/1961 | Sazyniski et al. | 324—37 |
| 2,994,032 | 7/1961 | Hansen | 324—37 |
| 3,029,382 | 4/1962 | Cochran et al. | 324—37 |

WALTER L. CARLSON, *Primary Examiner.*

R. J. CORCORAN, *Assistant Examiner.*